(12) United States Patent
Uda et al.

(10) Patent No.: US 10,960,356 B2
(45) Date of Patent: Mar. 30, 2021

(54) MEMBRANE MODULE

(71) Applicant: NITTO DENKO CORPORATION, Ibaraki (JP)

(72) Inventors: Yasuhiro Uda, Ibaraki (JP); Kentarou Kobayashi, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/083,286

(22) PCT Filed: Feb. 24, 2017

(86) PCT No.: PCT/JP2017/007052
§ 371 (c)(1),
(2) Date: Sep. 7, 2018

(87) PCT Pub. No.: WO2017/169385
PCT Pub. Date: Oct. 5, 2017

(65) Prior Publication Data
US 2019/0111397 A1  Apr. 18, 2019

(30) Foreign Application Priority Data

Mar. 28, 2016  (JP) .............................. JP2016-063475

(51) Int. Cl.
*B01D 63/10* (2006.01)
*B01D 71/26* (2006.01)

(52) U.S. Cl.
CPC ........... *B01D 63/103* (2013.01); *B01D 63/10* (2013.01); *B01D 71/26* (2013.01);
(Continued)

(58) Field of Classification Search
CPC ...... B01D 63/103; B01D 63/10; B01D 71/26; B01D 2313/04; B01D 2313/56; B01D 2313/20
See application file for complete search history.

(56) References Cited

U.S. PATENT DOCUMENTS 5,230,812 A * 7/1993 Williams ............... B01D 35/30
210/436
2006/0124517 A1* 6/2006 Scaringe ............... B01D 61/08
210/137
(Continued)

FOREIGN PATENT DOCUMENTS

CN  1835788  9/2006
CN  102307652  1/2012
(Continued)

OTHER PUBLICATIONS

International Search Report, dated May 9, 2017, in International Patent Application No. PCT/JP2017/007052.
(Continued)

*Primary Examiner* — Waqaas Ali
(74) *Attorney, Agent, or Firm* — Knobbe Martens Olson & Bear, LLP (57) ABSTRACT

Provided is a membrane module which has a simple and easy structure to restrain its vessel from being increased in costs, and which allows to fabricate the vessel by a simple and easy work, and further to locate an inlet for a fluid, and others at respective predetermined positions of the membrane module.

4 Claims, 6 Drawing Sheets (52) U.S. Cl.
CPC ...... *B01D 2313/04* (2013.01); *B01D 2313/20* (2013.01); *B01D 2313/56* (2013.01)

(56) References Cited

U.S. PATENT DOCUMENTS

2011/0290711 A1    12/2011    Katayama et al.
2012/0304856 A1*   12/2012    Kanetsuki ............ B01D 53/228
                                                           95/47

FOREIGN PATENT DOCUMENTS

| | | |
|---|---|---|
| JP | U1976-106245 | 2/1975 |
| JP | H06-226062 | 8/1994 |
| JP | H10-137558 | 5/1998 |
| JP | 2008-207049 | 9/2008 |
| JP | 2014-505822 | 3/2014 |
| JP | 2014-240076 | 12/2014 |
| WO | WO 2005/018783 | 3/2005 |
| WO | WO 2012/083405 | 6/2012 |

OTHER PUBLICATIONS

International Preliminary Report on Patentability, dated Oct. 2, 2018, in International Patent Application No. PCT/JP2017/007052.
Chinese Office Action, dated Jan. 4, 2021, in corresponding Chinese Patent Application No. 201780017272.4.

* cited by examiner

MEMBRANE MODULE

TECHNICAL FIELD

The present invention relates to a membrane module having a separating membrane, and a vessel which holds this separating membrane and has an inlet and outlets for fluid, more specifically, to a fitting structure of an end of this vessel.

BACKGROUND ART

As the structure of a conventional spiral membrane element (hereinafter referred to merely as a "membrane element" also), known is a structure equipped with a wound body yielded by winding one or more separating membranes, supply-side flow-channel matters and permeation-side flow-channel matters, one or more separating membranes, supply-side flow-channel matters and permeation-side flow-channel matters onto a perforated central pipe (see, for example, Patent Document 1).

Figure 7:
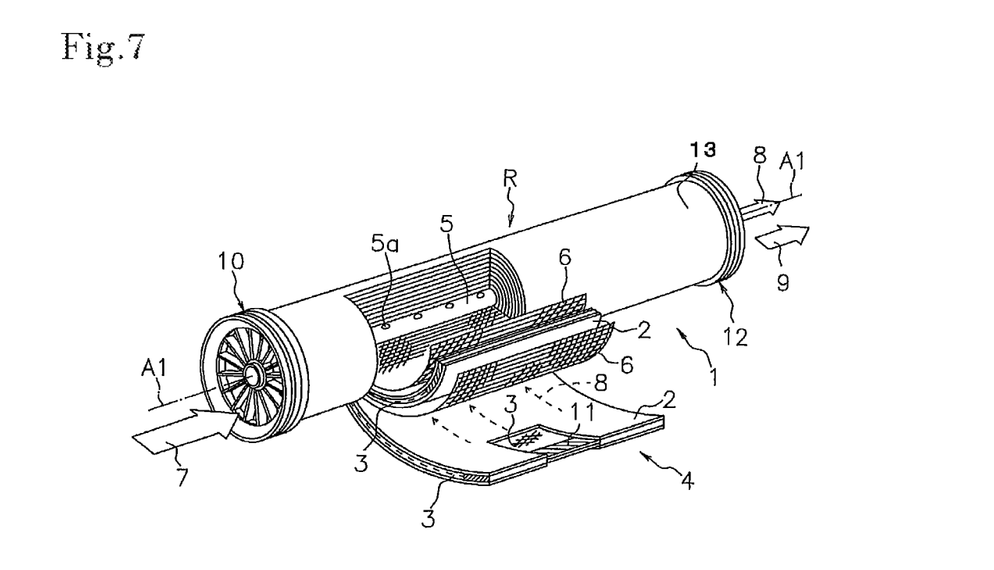
FIG. 7 is a perspective view illustrating an example of a conventional spiral membrane element.

FIG. 7 is a perspective view of a conventional membrane element, the view being obtained by cutting the membrane element partially. The membrane element illustrated in this figure, which is a membrane element 1, has a structure yielded by winding, around a central pipe 5, membrane members including separating membranes 2, supply-side flow-channel matters 6, and permeation-side flow-channel matters 3. More specifically, envelope-form membranes (baglike membrane) are each formed by putting two of the separating membranes 2, respectively, onto both surfaces of one of the permeation-side flow-channel matters 3, and then bonding these members to each other at their three sides. Envelope-state openings thereof are fitted to the central pipe 5. The resultants are spirally wound, together with the net-form supply-side flow-channel matters 6, onto the outer peripheral surface of the central pipe 5. In this way, the membrane element is formed. On an upstream side of this wound body R, an upstream-side end member 10, such as a seal carrier, is located; and on a downstream side thereof, a downstream-side end member 12, such as a telescoping preventing member, is located.

When this membrane element 1 is used, a raw liquid 7 is supplied from one of the two end surface sides of the membrane element 1. The supplied raw liquid 7 flows along the supply-side flow-channel matters 6 in a direction parallel with an axial direction of the central pipe 5 to be discharged as a concentrated liquid 9 from the other end surface side of the membrane element 1. As represented by broken-line arrows in the figure, a permeation liquid 8 that has permeated the separating membranes 2, in a step in which the raw liquid 7 flows along the supply-side flow-channel matters 6, flows along the permeation-side flow-channel matters 3 from openings 5a to the inside of the central pipe 5, and then flows out from one of the ends of this central pipe 5.

A conventional spiral membrane module, in which such a membrane element 1 is held in a pressure vessel, has a structure in which: the pressure vessel has, at one of the two ends thereof, a raw liquid supplying portion, and has, at the other end, a discharge portion for concentrated liquid, and a discharge portion for permeation liquid; and the raw liquid flows into the membrane element 1 by effect of a sealing member located on the outer periphery of the upstream-side end member 10.

The pressure vessel has a structure in which: the vessel has a cylindrical member and an end plate for exchanging the membrane element 1 to another membrane element; and the end plate can be fastened through, for example, bolts, to a flange portion located at an end of the cylindrical member.

In the meantime, in the case of a membrane module having a hollow fiber membrane, a vessel in which the hollow fiber membrane is held is integrated in many cases. For example, Patent Document 2 discloses, for example, the following: a structure in which a vessel holding a hollow fiber membrane has a cylindrical member and a cap that can be screwed and fitted to an end of this member, and an O ring is interposed between the two; and the matter that the cap is bonded and fixed to the cylindrical member.

PRIOR ART DOCUMENTS

Patent Documents

Patent Document 1: JP-A-10-137558
Patent Document 2: JP-A-2014-240076

SUMMARY OF THE INVENTION

Problems to be Solved by the Invention

However, when it is unnecessary to exchange membrane elements, the structure in which the flange portion is fitted to the cylindrical member causes a problem that production costs of the vessel relatively increase excessively. As described in Patent Document 2, a structure in which a cap is fixed to a cylindrical member only through an adhesive has a problem that unless the adhesion area thereof is made large, the vessel cannot ensure a sufficient pressure resistance. Moreover, in the structure in which the cap is screwed and engaged to the cylindrical member, the position of the rotated cap is unfavorably specified when the cap has been screwed. Thus, there is caused a problem that an inlet for a fluid, and others cannot be located at respective predetermined positions of the membrane element. Additionally, a work for the screwing tends to become complicated.

Thus, an object of the present invention is to provide a membrane module which has a simple and easy structure to restrain its vessel from being increased in costs, and which allows to fabricate the vessel by a simple and easy work, and further to locate an inlet for a fluid, and others at respective predetermined positions of the membrane module.

Means for Solving the Problems

The object can be attained by the present invention as described below.

The membrane module of the present invention is a membrane module comprising a separating membrane, and a vessel that holds the separating membrane and has an inlet and outlets for a fluid; wherein the vessel comprises an outer cylindrical member, an internally fitting member that is internally fitted to at least one end of the outer cylindrical member, and a sealing member and an elastic member that are interposed between the outer cylindrical member and the internally fitting member; the outer cylindrical member has an inner-wall circular groove in an inner-wall surface of the end; the internally fitting member has an outer-wall circular groove at a position of an outer-wall surface of the internally fitting member, this position corresponding to that of the inner-wall circular groove; and the elastic member is engaged with the inner-wall circular groove and the outer-wall circular groove, and can be enlarged or reduced in size to be substantially held in the inner-wall circular groove or the outer-wall circular groove.

According to the membrane module of the present invention, the elastic member can be enlarged or reduced in size to be substantially held in the inner-wall circular groove or the outer-wall circular groove. Thus, when the internally fitting member is inserted to the end of the vessel, the elastic member can be engaged with the outer-wall circular groove and the inner-wall circular groove to be extended to these two grooves, and further the dropout of the internally fitting member can be stopped only by performing the insertion in the state that the elastic member is substantially held in the inner-wall circular groove or the outer-wall circular groove. In this engaged state, the sealing member interposed between the outer cylindrical member and the internally fitting member allows to prevent the fluid from leaking out. Because a simple and easy structure thereof, costs of the vessel can be restrained, and fabrication into the vessel can be attained by a simple and easy work. Additionally, it is unnecessary to screw and engage any two member of the module with each other. Thus, the internally fitting member can be freely rotated, so that the inlet for the fluid, and others can be located at predetermined positions, respectively. As a result, a membrane module can be provided which has a simple and easy structure to restrain its vessel from being increased in costs, and which allows to fabricate the vessel by a simple and easy work, and further to locate an inlet for the fluid, and others at respective predetermined positions of the membrane module.

It is preferred in the membrane module that about the outer cylindrical member, its inner wall has a substantially circular sectional shape; and the elastic member is a C ring that can be reduced in size to not more than a peripheral size of the inner wall. The use of this C ring allows to reduce the elastic member in size to not more than the peripheral size of the inner wall of the outer cylindrical member. After the internally fitting member is inserted to the end of the vessel, the C ring is enlarged in diameter to be engaged with the outer-wall circular groove. Consequently, the dropout of the internally fitting member can be stopped.

At this time, the elastic member is preferably a C ring having an inclined surface enlarged in diameter from a central side of the outer cylindrical member toward an end side thereof. Even in the state that the C ring is not completely held in the outer-wall circular groove, the matter that the elastic member has this inclined surface causes force to be worked in a direction along which the C ring is reduced in size when the inclined surface contacts the end edge of the inner wall of the outer cylindrical member. Consequently, the internally fitting member can be smoothly inserted to the end of the vessel. For the same reason, the outer cylindrical member preferably has, at an end edge of its inner-wall surface, an inclined surface enlarged in diameter from the central side of the outer cylindrical member toward the end side thereof.

It is also preferred that the internally fitting member has a circular groove for sealing, nearer to a center of the outer cylindrical member than the outer-wall circular groove; and the sealing member is an O ring held in the circular groove for sealing. When the circular groove for sealing is made at this position, the O ring is held nearer to the center than the elastic member is held. It is therefore possible to prevent the fluid from flowing into the outer-wall circular groove and the inner-wall circular groove to remain in the grooves.

It is also preferred that a membrane element is held in the vessel: the membrane element comprising a perforated central pipe, a wound body in which a membrane member comprising the separating membrane, a supply-side flow-channel matter, and a permeation-side flow-channel matter are wound around the central pipe; and an exterior member located on/over an outer periphery of the wound body.

It is known that such a membrane element is large in effective membrane area per unit volume for a spiral membrane element, so that the membrane element can give a high pressure. Thus, the membrane element described in the immediately preceding paragraph is in particular useful as a membrane element used in the membrane module of the present invention.

BRIEF DESCRIPTION OF THE DRAWINGS

FIG. 4(a) is a fabricating perspective view of an end of its vessel, and FIG. 4(b) is a vertically sectional view of the end of the vessel.

MODE FOR CARRYING OUT THE INVENTION

The membrane module of the present invention is a membrane module that has a separating membrane, and a vessel that holds the separating membrane and has an inlet and outlets for a fluid. This vessel has a characterized fitting structure. For this reason, about constituents other than the fitting structure of the vessel, all constituents or structures known in the prior art may be adopted, examples thereof including a known membrane element constituent, and a known inlet and outlet structure for a fluid.

Figure 1:
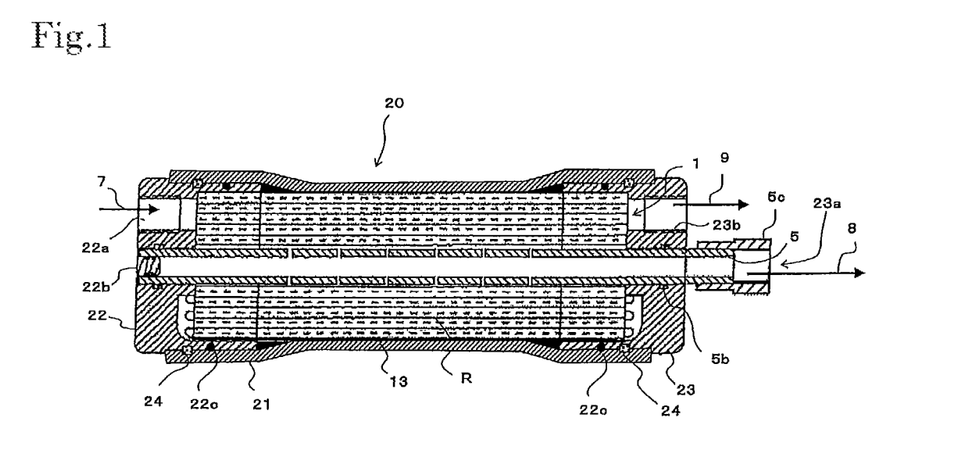
FIG. 1 is a vertically sectional view illustrating an example of the membrane module of the present invention.

In the present embodiment, as illustrated in FIG. 1, a demonstration will be made about an example of a case where a membrane element is held, this element including the following: a perforated central pipe 5; a wound body R in which membrane members are wound on the central pipe 5; and an exterior member 13 located on the outer periphery of the wound body R. The membrane members are substantially the same as in a spiral membrane element in the prior art. As illustrated in FIG. 7, the membrane elements include, for example, separating membranes 2, supply-side flow-channel matters 6, and permeation-side flow-channel matters 3.

In the present embodiment, as illustrated in, for example, FIG. 1, the demonstrated example is an example in which its vessel is a pressure vessel 20 which holds the membrane element 1, and which has a supply portion 22a for a raw liquid 7 at one of the two ends in the axial direction of the vessel, and has a discharge portion 23b for a concentrated liquid 9 and a discharge portion 23a for a permeation liquid 8 at the other end in the axial direction.

(Membrane Element)

As illustrated in FIG. 7, the membrane element 1 may be the same spiral membrane element as in the prior art; it is however possible to omit the upstream-side end member 10 having, for example, a seal carrier function, and the downstream-side end member 12 having a function as, for example, a telescoping preventing member. Thus, a description will be made with reference to FIG. 7.

As illustrated in FIG. 7, the membrane element 1 is equipped with: a perforated central pipe 5; a wound body R in which membrane members each including one or more separating membranes 2, one or more supply-side flow-channel matters 6, and one or more permeation-side flow-channel matters 3 are wound on the central pipe 5; and an exterior member 13 located on the outer periphery of the wound body R. In the present embodiment, the demonstrated example is an example in which the plural membrane members, which include the separating membranes 2, the supply-side flow-channel matters 6 and the permeation-side flow-channel matters 3, are wound on the central pipe 5. However, a single separating membrane unit may be wound on the central pipe.

The membrane element 1 is usually equipped with sealing portions for preventing supply-side flow-channels from being mixed with permeation-side flow-channels. When envelope-form membranes (baglike membranes) are each formed, for example, by putting two of the separating membranes 2, respectively, onto both surfaces of one of the permeation-side flow-channel matters 3, and then bonding these members to each other at their three sides, one of the sealing portions 11 is formed at an outer-peripheral-side end side of the envelope-form membrane, and two of the sealing portions are formed at an upstream-side end side thereof, and at a downstream-side end side thereof. It is preferred that one of the sealing portions is further located between the central pipe 5, and inner-peripheral-side ends of the upstream-side end side and the downstream-side end side.

About the envelope-form membranes, their openings are fitted to the central pipe 5. The envelope-form membranes are spirally wound, together with the netlike supply-side flow-channel matters 6, onto the outer peripheral surface of the central pipe 5. In this way, the wound body R is formed. On an upstream side of this wound body R, for example, the upstream-side end member 10, such as a seal carrier, may be located; and on a downstream side thereof, the downstream-side end member 12, such as a telescoping preventing member, may be optionally located.

When this membrane element 1 is used, a raw liquid 7 is supplied from one of the two end surface sides of the membrane element 1. The supplied raw liquid 7 flows along the supply-side flow-channel matters 6 in a direction parallel with an axial direction of the central pipe 5 to be discharged as a concentrated liquid 9 from the other end surface side of the membrane element 1. As represented by broken-line arrows in the figure, a permeation liquid 8 that has permeated the separating membranes 2, in a step in which the raw liquid 7 flows along the supply-side flow-channel matters 6, flows along the permeation-side flow-channel matters 3 from openings 5a to the inside of the central pipe 5, and then flows out from one of the ends of this central pipe 5.

The separating membranes 2, the supply-side flow-channel matters 6, the permeation-side flow-channel matters 3, and the central pipe 12 may be the same as in the prior art.

The supply-side flow-channel matters 6 may each be, for example, a net-form sheet or a mesh-form sheet made of any material. The material is preferably, for example, a polyolefin such as polypropylene or polyethylene. The permeation-side flow-channel matters 3 may each be, for example, a net-form sheet or a mesh-form sheet, a grooved sheet, or an undulate sheet made of any material. The separating membranes 2 may each be, for example, a reverse osmotic membrane, a nano-filtration membrane, or an ultrafiltration membrane.

In the same manner as in the membrane element 1 in the prior art, the exterior member 13 may be a resin sheet, a resin tape or a fiber-reinforced resin. A composite structure of two or more of these examples may be used.

(Pressure Vessel)

The vessel in the present invention includes an outer cylindrical member, an internally fitting member fitted into at least one of the two ends of the outer cylindrical member, and a sealing member and an elastic member interposed between the outer cylindrical member and the internally fitting member. As illustrated in, for example, FIGS. 1 and 4, in the present embodiment, an example is demonstrated in which a pressure vessel 20 includes a cylindrical member 21, which is an outer cylindrical member, a first end member 22, which is an internally fitting member fitted into one of the two ends of the cylindrical member, and a sealing member 22c and an elastic member 24 interposed between the cylindrical member 21 and the first end member 22. The illustrated example is also an example including a second end member 23, which is another internally fitting member fitted into the other end, and a sealing member 22c and an elastic member 24 interposed between the cylindrical member 21 and the second end member 23. Hereinafter, a fitting structure of the first end member 22 will be described. Substantially the same structure is also applicable to the second end member 23.

Figure 4:
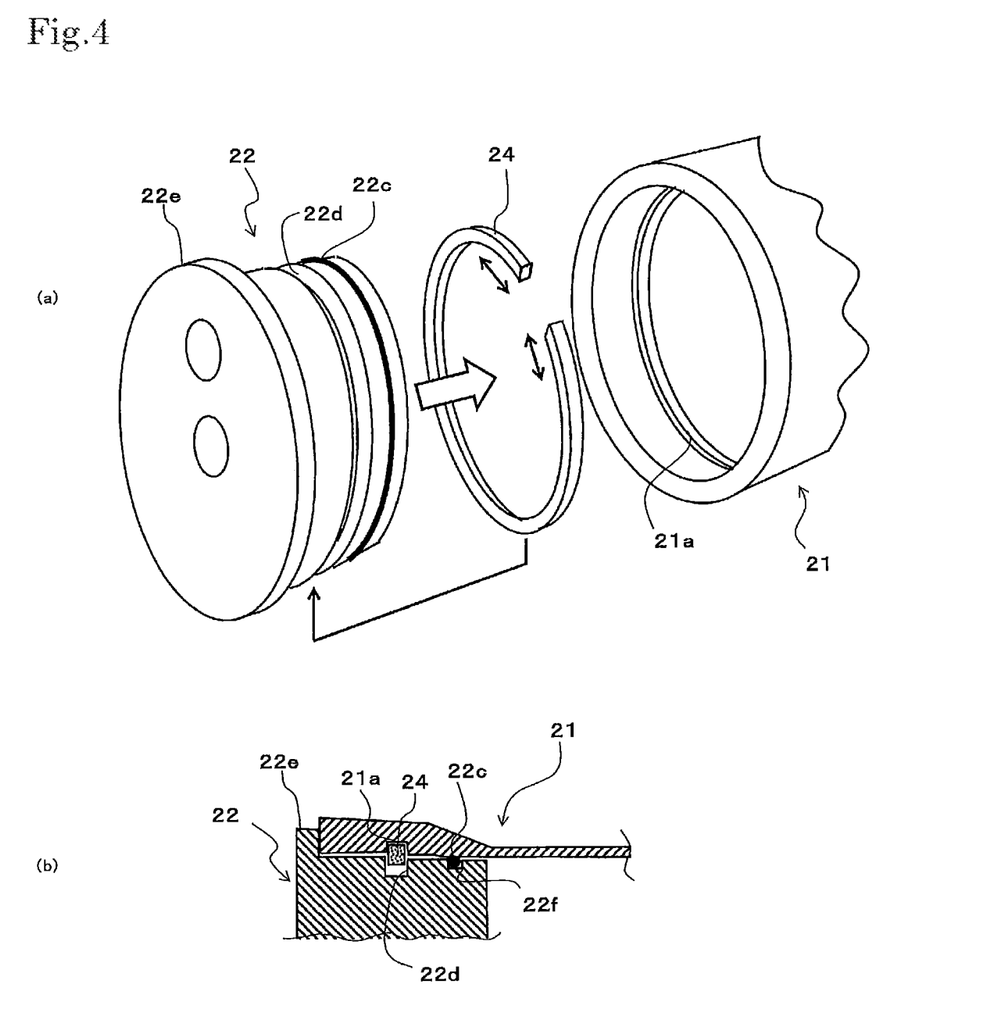
FIG. 4 are each a view illustrating a main portion of the example of the membrane module of the present invention.

The cylindrical member 21, which is the outer cylindrical member, has an inner-wall circular groove 21a in an inner wall surface of the one end of the cylindrical member. The first end member 22, which is the internally fitting member, has an outer-wall circular groove 22d at a position of an outer wall surface of this member, this position facing the inner-wall circular groove 21a. In the present invention, the inner-wall circular groove 21a and the outer-wall circular groove 22d are sufficient to be located to face each other at least partially. Thus, these grooves do not need to be located in the state that the respective wholes of these grooves face each other completely.

As illustrated in, for example, FIG. 4(b), the elastic member 24 concerned is engaged with the inner-wall circular groove 21a and the outer-wall circular groove 22d. In the illustrated example, the elastic member 24 is engaged with both of a central-side wall and an end-side wall of each of the inner-wall circular groove 21a and the outer-wall circular groove 22d. In the present invention, the elastic member 24 is sufficient to be engaged with the end-side wall of the inner-wall circular groove 21a and the central-side wall of the outer-wall circular groove 22d. This manner allows to prevent the internally fitting member from dropping out when a pressure is generated in the vessel.

The elastic member 24 can be enlarged or reduced in size to be substantially held and fitted in the inner-wall circular groove 21a or the outer-wall circular groove 22d. In the present embodiment, an example is illustrated in which the elastic member 24 is a C ring which can be reduced into not more than a peripheral size of the inner wall.

Specifically, as illustrated in, for example, FIG. 4(a), the diameter of the elastic member 24 is made larger than that of the outer-wall circular groove 22d in the first end member 22, and then externally fitted to this groove (in this state, the elastic member 24 is larger in diameter than the outer-wall circular groove 22d); and then this elastic member 24 is reduced in diameter by hand or with a tool or some other, so that this member can be substantially held and fitted into the outer-wall circular groove 22d. Thus, in this state, the elastic member can be inserted into the one end of the cylindrical member 21. When the elastic member is inserted inward to the position of the inner-wall circular groove 21a, the elastic member 24 is enlarged in diameter to be returned to the original size thereof. In this way, the elastic member can be engaged with the inner-wall circular groove 21a.

In a case where the outer diameter of the elastic member 24 is smaller than the inner diameter of the cylindrical member 21 when the elastic member is reduced in size, the first end member 22 can be inserted into the end of the cylindrical member 21 even when the elastic member is not partially held in the outer-wall circular groove 22d. It is therefore unnecessary that the elastic member 24 is enlargeable or reducible in size to be completely held in the inner-wall circular groove 21a or the outer-wall circular groove 22d.

In the illustrated example, a diameter-enlarged portion 22e is disposed at the first end member 22, which is the internally fitting member. In this way, the diameter-enlarged portion 22e is brought into contact with an end surface of the cylindrical member 21, so that the internally fitted state can be positionally fixed. It is therefore possible to omit the diameter-enlarged portion 22e.

The material of the elastic member 24 is a resin, a metal or a rubber, or any composite material of two or more of these examples. The material is preferably a resin or metal from the viewpoint of the endurance of the engaging, the bending elasticity of the material, an easy production of the member, and others.

The illustrated example demonstrates a case where cross sections of the elastic member 24 are rectangular. However, the sectional shape thereof may be any sectional shape as far as the elastic member 24 can be engaged with at least the end-side wall of the inner-wall circular groove 21a and the central-side wall of the outer-wall circular groove 22d (see FIGS. 6(a) to 6(c)).

The sealing structure in which the sealing member 22c is used is not particularly limited, and may be any sealing structure known in the prior as far as the first end member 22 can be inserted to the one end of the cylindrical member 21, and can ensure a liquid-sealed structure.

In the illustrated example, the sealing member 22c is an O ring. The first end member 22, which is the internally fitting member, has a circular groove 22f for sealing, nearer to the center of the outer cylindrical member than the first end member has the outer-wall circular groove 22d. The O ring is held in the circular groove 22f for sealing. Such a sealing structure and a dropout-stopping structure based on the elastic member 24 are simple and easy structures. Thus, the vessel can be restrained from being increased up in costs, and fabrication into the vessel can be attained by simple and easy operations. Additionally, it is unnecessary to screw and engage any two member of the module with each other. Thus, the internally fitting member can be freely rotated, so that the inlet for the fluid, and others can be located at predetermined positions, respectively.

In the present embodiment, the pressure vessel 20 further has the second end member 23. The second end member 23 is fitted to the other end of the cylindrical member 21 in a liquid-sealed state. A structure for attaining the liquid-sealed state may be, for example, a structure equivalent to the fitting structure of the first end member 22. The first end member 22 and the second end member 23 may be produced, for example, by shaping using a resin.

The cylindrical member 21 may be made of any material such as a resin, a metal or a ceramic material. From the viewpoint of the pressure-resistant performance of this member, and the lightness thereof, it is preferred to use a cylindrical mold such, as a mandrel, and form the cylindrical member by use of a fiber-reinforced resin in which a reinforced fiber (roving fiber) is wound onto this mold. In order to make the inner-wall circular groove 21a, it is advisable to set, around the cylindrical mold, a mold member which has the same shape as the inner-wall circular groove 21a and which can be divided into plural parts, shape the cylindrical member 21, and subsequently take away the mold member.

Figure 2:
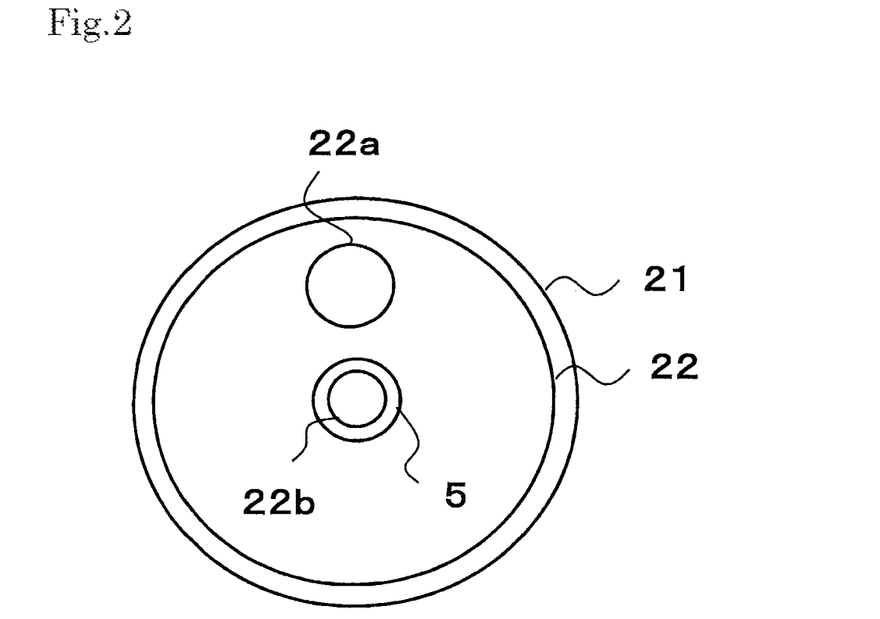
FIG. 2 is a left side view illustrating the example of the membrane module of the present invention.
Figure 3:
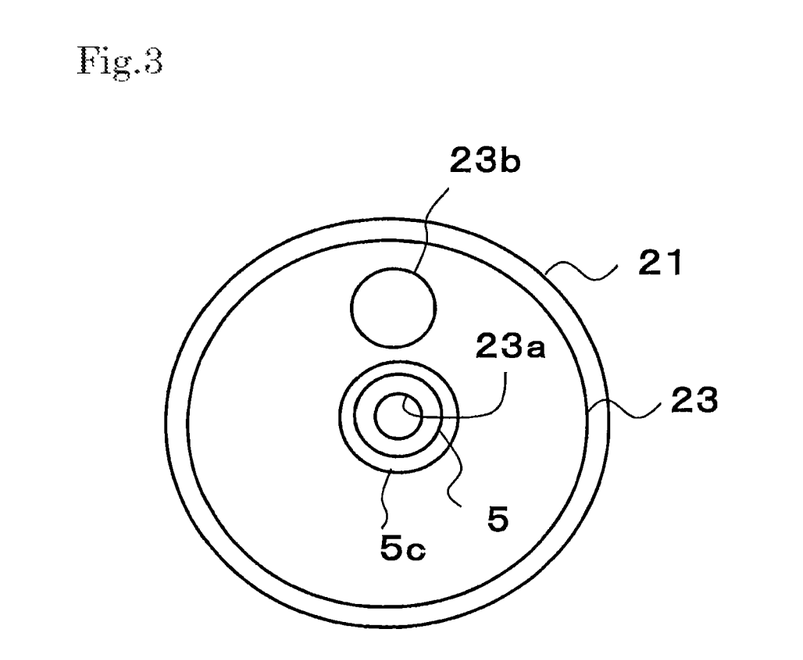
FIG. 3 is a right side view illustrating the example of the membrane module of the present invention.

As illustrated in FIGS. 1 to 3, in the supply portion 22a of the first end member 22, for supplying the raw liquid 7, and a discharge portion 22b of the second end member 23 for discharging the concentrated liquid 9, respective openings are made which connecting pipes that are to be connected to external pipes are fitted to in a liquid-sealed state. In order to make the connecting pipes into the liquid-sealed state, for example, an O ring is used, and further various structures for dropout-stopping may be adoptable (all illustrations of the member and the structures are omitted).

As illustrated in FIGS. 1 and 3, the second end member 23 has a discharge portion 23a for discharging the permeation liquid 8. In this example, a sealing member 5b such as an O ring is caused to be held in an internally fitting portion of the second end member 23. The inserted central pipe 5 is fitted into the second end member to keep these members in a liquid-sealed state. To a tip of the central pipe 5, a connecting pipe 5c to which an external pipe is to be connected is fitted.

As illustrated in FIGS. 1 to 3, when the second end member 23 has the discharge portion 23a for the permeation liquid 8, the following is disposed at the first end member 22: a sealing stopper 22b for blocking up the central pipe 5 or a fitting-in portion having one stopped end. In this example, a sealing member 5b such as an O ring is caused to be held in the fitting-in portion of the first end member 22, and the inserted central pipe 5 is fitted into this portion. Furthermore, the sealing stopper 22b is fitted thereto to keep these members in a liquid-sealed state.

(Other Embodiments of Membrane Module)

(1) In the above-mentioned embodiment, an example has been demonstrated in which only the second end member 23 has the discharge portion 23a for the permeation liquid 8. However, a discharge portion 23a for the permeation liquid 8 may be disposed in the first end member 22, or discharge portions 23a may be disposed in the first end member 22 and the second end member 23.

Figure 5:
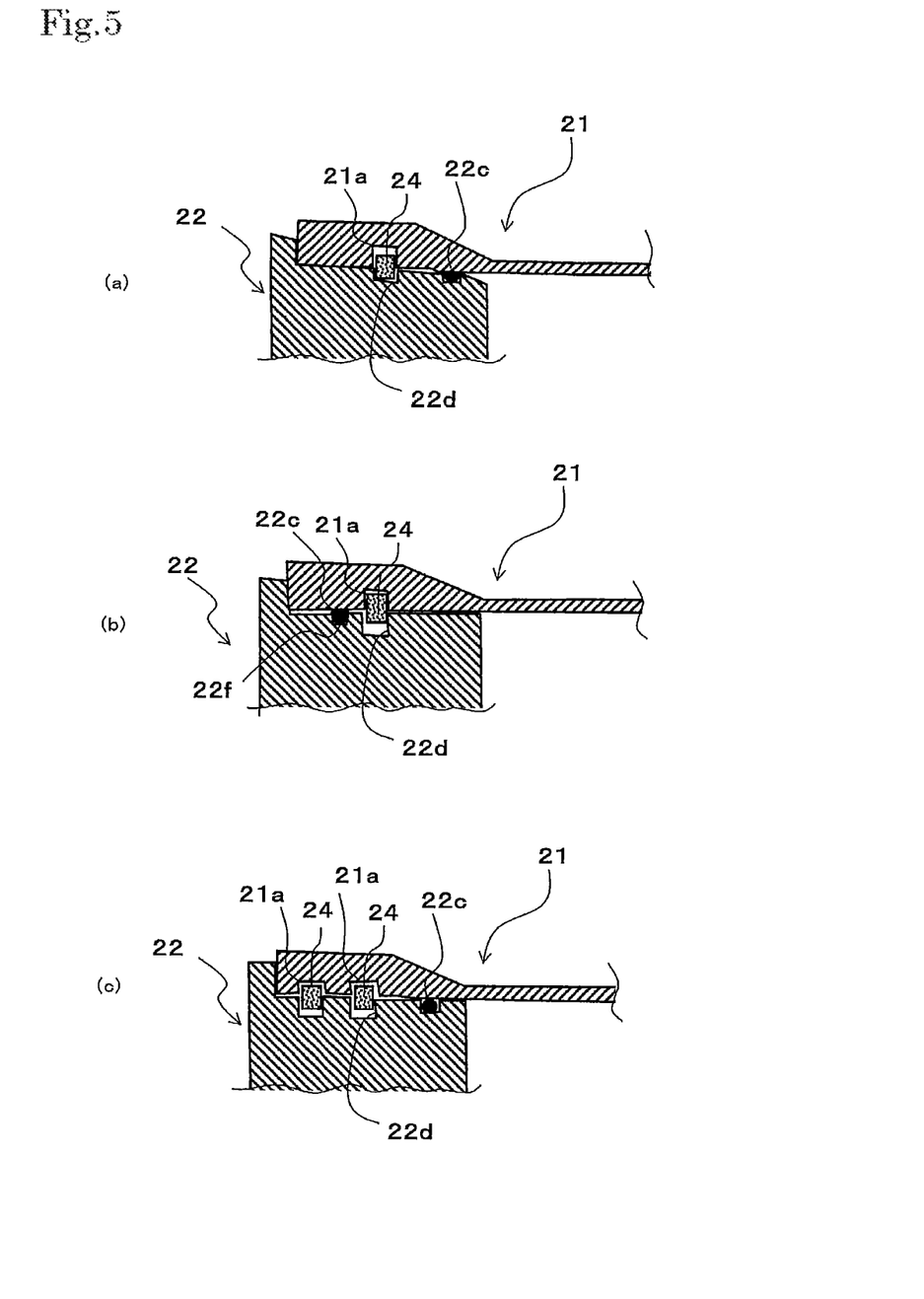
FIG. 5 are each a vertically sectional view illustrating a main portion of another example of the membrane module of the present invention.

(2) In the above-mentioned embodiment, an example has been demonstrated in which the elastic members 24 are C rings which can be reduced in size to not more than a peripheral size of the inner wall of the cylindrical member 21, which is the outer cylindrical member. However, as illustrated in FIG. 5(a), the elastic member 24 may be rendered a C ring which can be enlarged in size to not less than the peripheral size of the outer wall of a first end member 22.

In this case, the elastic member 24 is beforehand reduced in diameter, and then fitted into an inner-wall circular groove 21a in a cylindrical member 21. In this state, the first end member 22, which is the internally fitting member, is inserted into an end of the cylindrical member 21. At this time, the first end member 22 may have, at a tip thereof, an inclined surface reduced in diameter on the tip side of this surface. This manner attains the following in a case where at the time of the insertion, the elastic member 24 (C ring) is enlarged in diameter and then the elastic member 24 is inserted inward to the position of the outer wall circular groove 22d: the elastic member 24 is returned to the original size thereof, and then engaged with the inner-wall circular groove 21a and the outer-wall circular groove 22d.

(3) In the above-mentioned embodiment, an example has been demonstrated in which the first end member 22, which is the internally fitting member, has the circular groove 22f for sealing, nearer to the center of the outer cylindrical member than the first end member has the outer-wall circular groove 22d. However, as illustrated in FIG. 5(b), a first end member 22, which is an internally fitting member, has a circular groove 22f for sealing, nearer to the end of the outer cylindrical member than the first end member has the outer-wall circular groove 22d.

(4) In the above-mentioned embodiment, an example has been demonstrated which has the fitting structure in which the elastic member 24 is located at only one site. However, as illustrated in FIG. 5(c), the present invention may adopt a fitting structure in which elastic members 24 are located at two or more sites. In the same manner as about the sealing structure, the present invention may adopt a sealing structure in which sealing members 22c are used at two or more sites.

(5) In the above-mentioned embodiment, an example has been demonstrated in which the elastic member 24 is a C ring. However, in the present invention, any circular elastic member 24 is usable as far as the elastic member is an elastic member which is elastically deformed by external force to be changed in outer diameter or inner diameter. This circular elastic member 24 may be, for example, an elastic member in which plural circular-arc-form members are linked to each other through, for example, coil springs.

(6) In the above-mentioned embodiment, an example has been demonstrated in which the shape of the outer cylindrical member is cylindrical. However, in the present invention, the outer cylindrical member may be rendered an outer cylindrical member having a shape other than any cylindrical shape, for example, an outer cylindrical member having a quadrangular prism shape. About, for example, the quadrangular-prism-shape outer cylindrical member, the membrane module of the present invention can be formed by using an elastic member in which four L-shaped members are linked to each other through, for example, coil springs.

Figure 6:
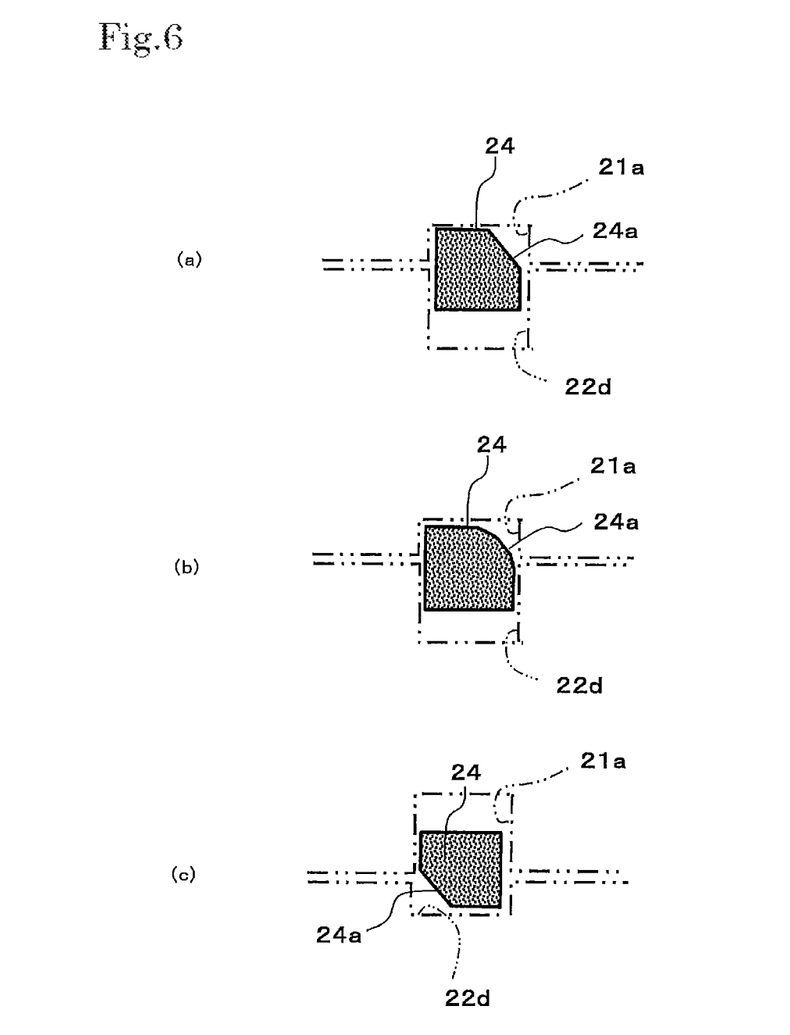
FIG. 6 are each a vertically sectional view illustrating a main portion of still another example of the membrane module of the present invention.

(7) In the above-mentioned embodiment, an example has been demonstrated which makes use of the elastic member 24 having a rectangular sectional shape. However, as illustrated in each of FIGS. 6(a) to 6(b), an elastic member having one out of various sectional shapes may be used. For example, an elastic member 24 illustrated in FIG. 6(a) has an inclined surface 24a enlarged in diameter from a central side of the outer cylindrical member toward an end side thereof. When the internally fitting member is inserted into an end of the outer cylindrical member, the end surface concerned of the outer cylindrical member is brought into contact with the inclined surface 24a of the elastic member 24 so that the elastic member 24 can be reduced in size. At this time, the inclined surface 24a does not need to be a plain face. As illustrated in FIG. 6(b), the inclined surface may be a curved face.

When an elastic member can be enlarged to be substantially held in an inner-wall circular groove, it is preferred that as illustrated in FIG. 6(c), the elastic member, which is an elastic member 24, has an inclined surface 24a reduced in diameter from an end side of the outer cylindrical member toward a central side thereof.

(8) In the above-mentioned embodiment, an example has been demonstrated in which the inner-wall circular groove 21a and the outer-wall circular groove 22d each have a rectangular sectional shape. However, in the present invention, the sectional shape of each of the inner-wall circular groove 21a and the outer-wall circular groove 22d is not particularly limited as far as the elastic member 24 can be engaged with at least the end-side wall of the inner-wall circular groove 21a and the central-side wall of the outer-wall circular groove 22d. However, in order to heighten the dropout-stopping effect based on the engaging, it is preferred that the end side-wall of the inner-wall circular groove 21a and the central side-wall of the outer-wall circular groove 22d are formed perpendicularly to the inner wall of the outer cylindrical member and the outer wall of the internally fitting member.

(9) In the above-mentioned embodiment, an example has been demonstrated which is a membrane module in which a spiral membrane element including flat membranes are held in a vessel. However, the present invention may be a membrane module in which hollow fiber membranes are held in a vessel. In this case, any one of the above-mentioned fitting structures is applied to a fitting structure of an end of a conventional vessel.

DESCRIPTION OF REFERENCE SIGNS

1 Membrane element
2 Separating membrane
3 Permeation-side flow-channel matter
5 Central pipe
5a Opening
6 Supply-side flow-channel matter
7 Raw liquid
8 Permeation liquid
9 Concentrated liquid
13 Exterior member
20 Pressure vessel (vessel)
21 Cylindrical member (outer cylindrical member)
21a Inner-wall circular groove
22 First end member (internally fitting member)
22a Supply portion for raw liquid
22c Sealing member
22d Outer-wall circular groove
23 Second end member (internally fitting member)
23a Discharge portion for permeation liquid
23b Discharge portion for concentrated liquid
24 Elastic member
24a Inclined surface
R Wound body

The invention claimed is:

1. A membrane module, comprising a separating membrane, and a vessel that holds the separating membrane and has an inlet and outlets for a fluid, wherein the vessel comprises an outer cylindrical member,
an end that is internally fitted to at least one end of the outer cylindrical member, and a seal and an elastic member that are interposed between the outer cylindrical member and the end,
the outer cylindrical member has an inner-wall circular groove in an inner-wall surface of an end side of the outer cylindrical member,
the end has an outer-wall circular groove at a position of an outer-wall surface of the end, the position of the outer-wall circular groove at least partially overlapping the position of the inner-wall circular groove,
and the elastic member is engaged with both of the inner-wall circular groove and the outer-wall circular groove, and can be enlarged or reduced in size to be partially held in the inner-wall circular groove or the outer-wall circular groove;

wherein a membrane element is held in the vessel: the membrane element comprising a perforated central pipe; a wound body in which a membrane member comprising the separating membrane, a supply-side flow-channel matter, and a permeation-side flow-channel matter are wound around the central pipe; and an exterior member located over an outer periphery of the wound body.

2. The membrane module according to claim 1, wherein the outer cylindrical member has, at an end edge of its inner-wall surface, an inclined surface enlarged in diameter from a central side of the outer cylindrical member toward the end side thereof.

3. The membrane module according to claim 1, wherein the end has a circular groove for sealing, nearer to a center of the outer cylindrical member than the outer-wall circular groove; and the seal is an O ring held in the circular groove for sealing.

4. The membrane module according to claim 2, wherein the has a circular groove for sealing, nearer to a center of the outer cylindrical member than the outer-wall circular groove; and the seal is an O ring held in the circular groove for sealing.

\* \* \* \* \*